United States Patent

Harada et al.

[11] Patent Number: 5,091,125
[45] Date of Patent: Feb. 25, 1992

[54] METHOD OF FORMING ANTI-SLIP SHOE SOLE

[75] Inventors: Masasuke Harada, Saitama; Hideki Hayafuchi, Kurume; Kouji Tsukamoto, Yanagawa, all of Japan

[73] Assignee: Asahi Corporation, Tokyo, Japan

[21] Appl. No.: 506,804

[22] Filed: Apr. 10, 1990

[30] Foreign Application Priority Data

Apr. 2, 1988 [JP] Japan ................................. 63-82092

[51] Int. Cl.$^5$ ............................................ B29C 67/22
[52] U.S. Cl. ................................. 264/45.3; 264/51; 264/108; 264/328.12
[58] Field of Search ............... 264/232, 108, 162, 244, 264/51, 45.3, 328.12

[56] References Cited

U.S. PATENT DOCUMENTS

| | | | |
|---|---|---|---|
| 1,152,935 | 9/1915 | Crane | 264/108 |
| 2,372,177 | 3/1945 | Conner | 264/328.12 |
| 2,822,627 | 2/1958 | Seiberling | 264/108 |
| 2,858,571 | 11/1958 | Dunbar | 264/232 |
| 3,064,391 | 11/1962 | Devol | 264/108 |
| 3,998,681 | 12/1976 | Williams et al. | 264/162 |
| 4,089,922 | 5/1978 | Saito et al. | 264/328.12 |
| 4,102,831 | 7/1978 | Osgood | 264/45.3 |
| 4,493,808 | 1/1985 | Sedlatschek et al. | 264/328.12 |

FOREIGN PATENT DOCUMENTS

| | | |
|---|---|---|
| 62-021904 | 2/1987 | Japan . |
| 62-021905 | 2/1987 | Japan . |
| 2139940 | 11/1984 | United Kingdom ................ 264/162 |

Primary Examiner—Robert A. Dawson
Assistant Examiner—Allan R. Kuhns
Attorney, Agent, or Firm—Fleit, Jacobson, Cohn, Price, Holman & Stern

[57] ABSTRACT

A method of producing an anti-slip shoe sole makes use of a shoe sole forming die having a plurality of independent, projection-forming cavities in the bottom thereof. The cavities open to a reverse side of the die through respective escape holes connected to the cavities. A foamable, unvulcanized green rubber containing hard fibers dispersed therein is set in the shoe sole forming die. Heat and pressure are applied to the unvulcanized green rubber to cause the unvulcanized green rubber to fill the cavities and further to flow into the escape holes, thereby forming a shoe sole blank having projections integral therewith. Buffing is effected on the bottom portions of the projections, thereby allowing ends of the hard fibers to appear in the ground-contact surfaces of the projections.

8 Claims, 1 Drawing Sheet

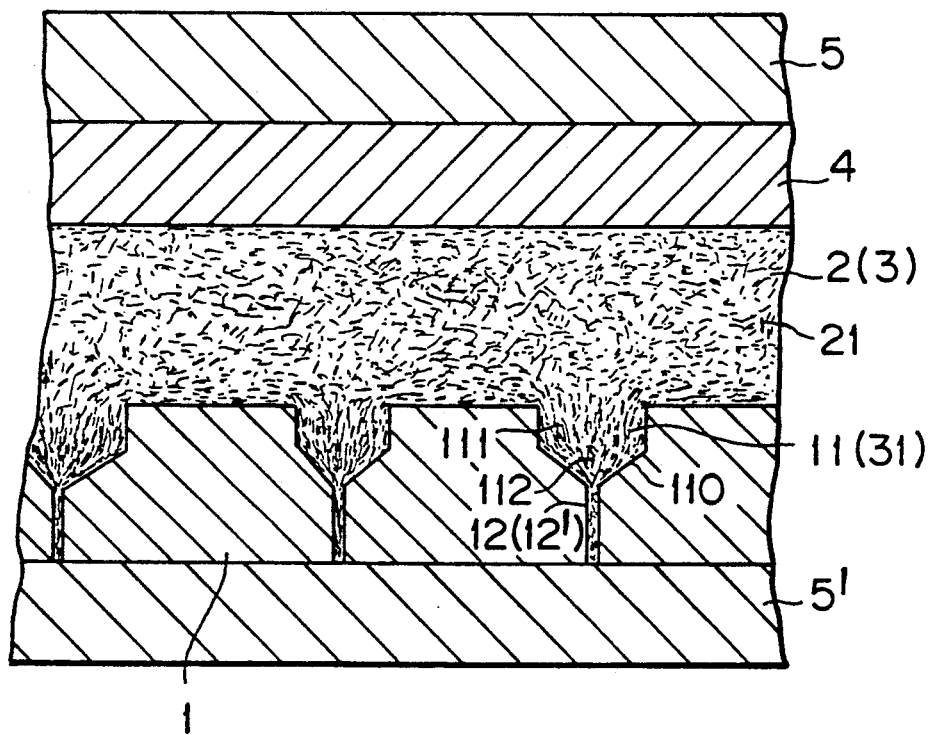
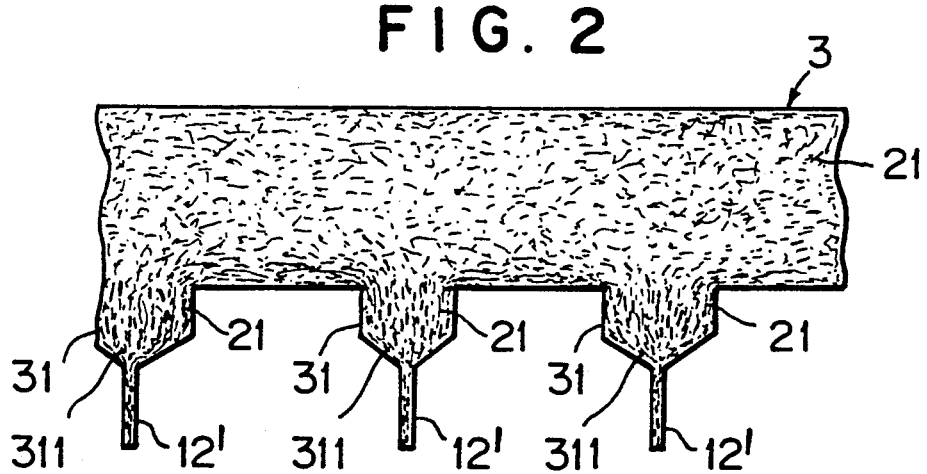
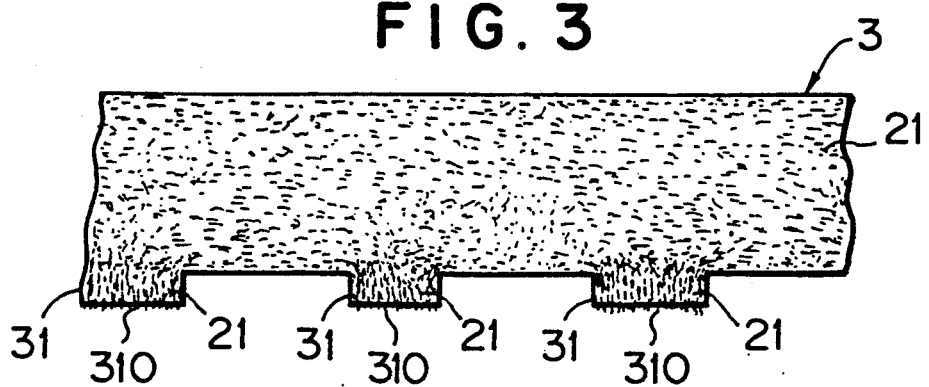

METHOD OF FORMING ANTI-SLIP SHOE SOLE

BACKGROUND OF THE INVENTION

The present invention relates to an anti-slip shoe sole.

Japanese Utility Model Unexamined Publication No. 62-21904 discloses a shoe sole which is formed by mixing glass fibers in unvulcanized rubber, rolling the mixture into sheets in which the glass fibers are oriented in the rolling direction, stacking a suitable number of the thus formed sheets cutting the stack of sheets in a plane perpendicular to the rolling direction so as to form anti-slip pieces, and embedding the anti-slip pieces in the ground contact surface of the shoe sole so that the cut surfaces of the anti-slip pieces will come into contact with the ground. The shoe sole produced through this process exhibits a superior anti-slip characteristic by virtue of the fact that the glass fibers dispersed in the material of the anti-slip pieces extend perpendicularly to the ground surface. Unfortunately, however, this type of shoe sole is expensive to manufacture because the anti-slip pieces require many production process steps as described and because laborious work is necessary for embedding the anti-slip pieces in the shoe sole.

A process for forming a shoe sole is also known which employs a shoe-sole forming die provided in the bottom surface thereof with a plurality of projection forming cavities. An unvulcanized green rubber having fibers of hard material such as glass fibers dispersed therein is placed in the die, and pressure and heat are applied to the rubber so as to fill the cavities with portions of the rubber and to vulcanize the same, whereby a shoe sole having a plurality of anti-slip projections is formed. This type of shoe sole suffers from the following disadvantages. When the unvulcanized green rubber is forced into the projection-forming cavities of the die, portions of the green rubber and air are confined in the cavities to flow in random directions so that the fibers in the green rubber filling the projection-forming cavities are oriented irregularly and at random. Therefore, the fibers of the hard material dispered in the anti-slip projections of the shoe sole thus formed does not produce any appreciable antislip effect.

SUMMARY OF THE INVENTION

Accordingly, an object of the present invention is to provide an inexpensive method of producing an anti-slip shoe sole having superior anti-slip performance and durability.

To this end, according to the present invention, there is provided a method of producing a shoe sole comprising the steps of: providing a shoe sole forming die having a multiplicity of independent projection-forming cavities in the bottom portion thereof, the cavities opening to a reverse side of the die through respective escape holes connected to the cavities; preparing unvulcanized green rubber containing hard fibers dispersed therein; placing the unvulcanized green rubber in the shoe sole forming die; applying heat and pressure to the unvulcanized green rubber to cause the unvulcanized green rubber to fill the cavities and further flow into the escape holes thereby forming a shoe sole blank having projections integral therewith; and effecting buffing of the bottom portions of the projections thereby allowing ends of the hard fibers 40 appearing in the ground-contact surfaces of the projections.

The above and other objects, features and advantages of the invention will become clear from the following description of the preferred embodiment and the attached drawings.

BRIEF DESCRIPTION OF THE DRAWINGS

FIG. 1 is a sectional view of an essential portion of a die used in a method embodying the present invention, illustrative of one of the steps of the method;

FIG. 2 is a sectional view of an essential portion of a shoe sole in a state immediately after separation from the die; and FIG. 3 is a sectional view of an essential portion of a completed anti-slip shoe sole.

DESCRIPTION OF THE PREFERRED EMBODIMENT

Referring to FIG. 1, a first die portion 1 used in the method of the present invention has a plurality of independent projection-forming cavities or recesses 11, 11 having escape holes 12. Holes 12 are formed by passages extending away from the recesses 11. Recesses 11 and escape holes 12 together extend from the forward or top side of the die and extend through the die portion 1 to the reverse or bottom side of die portion 1. A batch of unvulcanized green rubber 2, containing fibers 21 of a hard material, is injected or otherwise charged into the die portion 1 and a second, solid die portion 4. Pressure and heat are applied to the rubber 2 so that the rubber 2 is vulcanized while being forced into the projection-forming cavities 11 and further is made to flow into the escape holes 12. Air which is originally present in cavities or recesses 11 is compressed as the rubber 2 is forced into the cavities and moves into escape holes 12. Escape holes 12 are sealed off, by a compression plate 5' so that the air is trapped in escape holes 12. As a consequence, a shoe sole 3 is formed having a multiplicity of projections 31. Then, the lower ends 311 of the projections are buffed to grind away the rubber material until the ends of fibers 21 of the hard material are exposed at each bottom surface 310 of the projections.

Although various configurations of the projection-forming cavities are usable, it is preferred that the walls of the bottom portion of the cavity 11 conically converge downward in a funnel-like form into communication with the escape holes 12. Such a configuration of each projection-forming cavity enables the unvulcanized green rubber under pressure to smoothly flow in the cavities 11 towards the escape holes 12. The downwardly converging side walls 110 of the cavities effectively serve as guide surfaces which direct the flow of the rubber accurately towards the escape holes 12. This in turn enables the fibers 21 of the hard material to be more accurately and uniformly aligned with the projecting direction of the projections 31. In other words, a high degree of uniformity of orientation of fibers 21 in the direction in which the projections 31 extend away from the shoe sole 3 is obtained so as to offer greater anti-slip performance in the shoe sole.

The unvulcanized green rubber 2 may be a natural rubber, isoprene rubber, styrene butadiene rubber, high styrene rubber, acrylonitrile rubber, chloroprene rubber, ethylene propylene rubber, polyethylene chloride rubber, chloro-sulfonated polyethylene, or a mixture of two or more of these rubbers.

The fibers 21 of a hard material may be inorganic fibers such glass fibers, rock wool fibers, quartz fibers, silica fibers, wollastonite fibers, ceramics fibers and so forth, metallic fibers, carbonaceous fibers, or a mixture of two or more of these fibers.

Preferably, the hard fibers 21 are added in amount of 5 to 80 wt% per 100 wt% of rubber. The diameter and the length of the fibers preferably range between 0.05 μm and 30 μm and between 0.1 mm and 20 mm, respectively. A hard fiber content below the above-mentioned range or a fiber diameter or length smaller than the above-mentioned range tends to reduce anti-slip performance of the shoe sole. Conversely, a hard fiber content exceeding the above-mentioned range or a finer diameter or greater than the above-mentioned range tends to reduce the fluidity of the unvulcanized green rubber 2 during forming so as to impede orientation of the hard fibers 21 with the result that the anti-slip performance of the shoe sole is impaired.

According to the invention, the unvulcanized green rubber 2 can further contain one or more of a cross-linking agent, a cross-linking assistant, a cross-linking promoter, a filler, a pigment, stabilizer and so forth which are ordinarily used as additives for rubber compounds. It is also possible to add a foaming agent as required. The unvulcanized green rubber 2 with such an additive or additives is uniformly blended by a blending machine such as a Banbury mixer, Henschel mixer, mixing roll, kneader or the like, and the uniform blend thus formed is cut into a desired shape after having been formed into a sheet The thus formed unvulcanized green rubber 2 is set in the space formed between the bottom portion 1 and top portion 4 of a forming die. The rubber 2 is then heated, in a known manner, and pressed between compression plates 5 and 5' so as to fill the projection-forming cavities 11.

Air in the projection-forming cavities 11, along with any surplus unvulcanized green rubber 2, is forced into and through the escape holes 12. The unvulcanized green rubber 2 is thus allowed to flow into the projection-forming cavities smoothly and in a substantially uniform direction from the upper portions 111 of the cavities towards the lower ends 112 of the cavities. As a consequence, hard fibers 21 dispersed in the unvulcanized green rubber 2 filling the cavities 11 are arranged, i.e., oriented, substantially in parallel with the direction of flow of the unvulcanized green rubber 2. The green rubber 2 in the die is then cured under the influence of heat and pressure so that a shoe sole 3 is formed. The thus formed shoe sole 23 is buffed with a grinder or like tool for removing the lower end portions 311 of the projections 31, 31. The ends of hard fibers 21, which were oriented in substantially the axial directions of the projections 31, i.e., substantially perpendicularly to the ground-contact surface, are thus exposed at the bottom surfaces 310 of the projections 31.

As will be understood from the foregoing description, according to the present invention, a comparatively simple method is provided according to the invention which enables the hard fibers 21 in the projections 31 to be oriented substantially in parallel with the axes of the projections so that ends of the fibers 21 are disposed in that part of the shoe sole in contact with the ground. It is therefore possible to produce a shoe sole having distinguished anti-slip performance at a reduced cost.

EXAMPLE

A rubber mixture containing a natural rubber and styrene butadiene rubber, mixed at a weight ratio of 7:3, was prepared. Then, 30 wt% of glass fibers as the hard fibers 21 and a foaming agent ordinarily used in rubber compounds were mixed with 100 weight parts of the above-mentioned rubber mixture. The glass fibers used in this particular example were sold under the trademark MICRO-CHOPPED STRANDS RES 06, were 13 μm in diameter and 6 mm in length, and were sold by Nippon Itagarasu Kabushiki Kaisha. The mixture was kneaded by a kneader roll to form a uniform blend which was rolled into a sheet 5 mm thick. The sheet was then cut, whereby a batch of foamable unvulcanized green rubber 2 was prepared.

The thus obtained foamable unvulcanized green rubber 2 was set in a shoe sole forming die. The die was provided in the bottom portion thereof with a multiplicity of funnel-shaped projection-forming cavities 11 connected to escape holes 12 penetrating through to the reverse side of the die as heretofore described. Then, the upper die portion 4 was placed on the green rubber 2, and upper and lower press members such as compression plates 5,5' were activated to apply a pressure of 30 kg/cmz for 8 minutes at a temperature of 150° C., whereby a vulcanized shoe sole having integrally-formed projections 31 was obtained.

Then, the burrs 12' formed in the escape holes 12 of the die and the lower end portions 311 of the projections were removed through buffing conducted by a grinder. The shoe sole thus finished exhibited superior anti-slip performance.

What is claimed is:

1. A method of producing an anti-slip shoe sole comprising the steps of:
   providing a shoe sole forming die having a top portion, a bottom portion and a multiplicity of independent projection-forming cavities in said bottom portion, said bottom portion having a forward side and a reverse side, said cavities opening to the reverse side of said bottom portion through respective escape holes connected to said cavities;
   preparing unvulcanized green rubber containing hard fibers dispersed therein;
   placing said unvulcanized green rubber in said shoe sole forming die;
   applying heat and pressure to said unvulcanized green rubber;
   forcing by heating and pressurizing, said unvulcanized green rubber to flow, so as to fill said cavities and further to flow into escape holes, thereby forming a shoe sole blank having projections integral therewith and fibers dispersed in the green rubber oriented in parallel with the direction of flow;
   compressing air present in the cavities by said rubber, when said rubber s forced to flow into the cavities and holes causing said air to flow into said escape holes; and
   finishing the blank to form an anti-slip shoe sole.

2. A process according to claim 1, wherein said step of finishing comprises buffing said projections, whereby ground contact surfaces being exposed, hard fibers are formed.

3. A process according to claim 1, wherein said step of preparing comprises adding a foaming agent.

4. A process according to claim 3, wherein said step of applying heat to pressure comprises vulcanizing and foaming said unvulcanized green rubber.

5. A process according to claim 1, wherein said hard fibers are selected from the group consisting of glass fibers, rock wool fibers, quartz fibers, silica fibers, wollastonite fibers, ceramic fibers, metallic fibers, carbonaceous fibers, and a mixture of two or more of the above fibers.

6. A process according to claim 1, where said green unvulcanized rubber is selected from the group consisting of natural rubber, isoprene rubber, styrene-butadiene rubber, high-styrene rubber, acrylonitrile rubber, chloroprene rubber, ethylene propylene rubber, polyethylene chloride rubber, chloro sulfonated polyethylene and a mixture of two or more of the above rubbers.

7. A process according to claim 1, wherein said cavities have a substantially conical configuration.

8. A process according to claim 1, wherein said green unvulcanized rubber comprises one or more additives selected from the group consisting of a cross-linking agent, a cross linking assistant, a cross-promoter, a filler, a pigment and a stabilizer.

* * * * *